United States Patent
Breish et al.

(10) Patent No.: US 12,262,137 B2
(45) Date of Patent: Mar. 25, 2025

(54) FILM TRANSPORT APPARATUS CONTROLLER AND RELATED METHODS

(71) Applicant: DIGITAL CHECK CORP., Northbrook, IL (US)

(72) Inventors: Kurt Breish, Garden Valley, ID (US); Victor Mimken, Boise, ID (US); Anthony Senn, Boise, ID (US)

(73) Assignee: DIGITAL CHECK CORP., Northbrook, IL (US)

( * ) Notice: Subject to any disclaimer, the term of this patent is extended or adjusted under 35 U.S.C. 154(b) by 0 days.

(21) Appl. No.: 18/403,320

(22) Filed: Jan. 3, 2024

(65) Prior Publication Data

US 2024/0146861 A1 May 2, 2024

Related U.S. Application Data

(63) Continuation of application No. 17/892,638, filed on Aug. 22, 2022, now Pat. No. 11,902,689, which is a continuation of application No. 17/077,552, filed on Oct. 22, 2020, now Pat. No. 11,425,282, which is a continuation of application No. 16/374,411, filed on Apr. 3, 2019, now Pat. No. 10,848,645.

(Continued)

(51) Int. Cl.
*H04N 3/38* (2006.01)
*H04N 1/00* (2006.01)

(52) U.S. Cl.
CPC .......... *H04N 3/38* (2013.01); *H04N 1/00649* (2013.01); *H04N 1/0066* (2013.01); *H04N 1/00816* (2013.01)

(58) Field of Classification Search
CPC .... H04N 3/38; H04N 1/00649; H04N 1/0066; H04N 1/00816; G03B 1/48
See application file for complete search history.

(56) References Cited

U.S. PATENT DOCUMENTS

| 4,698,703 A | 10/1987 | Nishmura et al. |
| 5,836,533 A | 11/1998 | Hallamasek |

(Continued)

FOREIGN PATENT DOCUMENTS

| DE | 19812525 A1 | 9/1999 |
| EP | 0745890 A1 * | 5/1996 |

OTHER PUBLICATIONS

International Search Report and Written Opinion for related International Application No. PCT/US2019/025601; report dated Jun. 21, 2019; (9 pages).

(Continued)

*Primary Examiner* — Maria E Vazquez Colon
(74) *Attorney, Agent, or Firm* — K&L Gates LLP

(57) ABSTRACT

Methods and systems are presented for controlling a film transport apparatus of a film reel scanner. In one embodiment, a system is provided including a line scanning camera, a supply reel motor, a take-up reel motor, and a plurality of capstan motors. A control system may then be configured to receive and dynamically adjust position information from these motors. The control system may then provide the dynamically adjusted position information to a plurality of controllers, which may then generate control signals for the supply reel motor, the take-up reel motor, and the at least a subset of the capstan motors.

20 Claims, 11 Drawing Sheets

Related U.S. Application Data

(60) Provisional application No. 62/652,117, filed on Apr. 3, 2018.

(56) References Cited

U.S. PATENT DOCUMENTS

| | | | |
|---|---|---|---|
| 6,275,348 B1 * | 8/2001 | Walsh | G11B 15/54 |
| 6,428,639 B1 | 8/2002 | Oldenburg et al. | |
| 7,093,939 B2 | 8/2006 | Breish et al. | |
| 2008/0116836 A1 | 5/2008 | Sussmeier et al. | |
| 2010/0098399 A1 | 4/2010 | Breish et al. | |
| 2012/0087031 A1 * | 4/2012 | Goker | G11B 5/584 |
| | | | 360/39 |
| 2013/0076890 A1 * | 3/2013 | Bovee | H04N 3/38 |
| | | | 348/E5.049 |
| 2016/0321514 A1 | 11/2016 | Kahle | |

OTHER PUBLICATIONS

European Search Report for related European Application No. 19782412.1; action dated Jul. 8, 2021; (10 pages).

* cited by examiner

FILM TRANSPORT APPARATUS CONTROLLER AND RELATED METHODS

PRIORITY INFORMATION

The present application is a U.S. Continuation Patent Application based on U.S. application Ser. No. 17/892,638, filed on Aug. 22, 2022, which is a Continuation of U.S. application Ser. No. 17/077,552, filed on Oct. 22, 2020, which is a Continuation of U.S. application Ser. No. 16/374,411, filed on Apr. 3, 2019, which claims priority to U.S. Provisional Application No. 62/652,117, filed Apr. 3, 2018, the entire contents of which are incorporated herein by reference and relied upon.

BACKGROUND

Film reel scanners are used to scan and digitize reels of film (e.g., reels containing images of documents) for imaging and archiving purposes. Film to be scanned is stored on reels, which are connected to the scanner. The scanner is configured to control the movement of the film through the scanner in order to accurately scan the film.

SUMMARY

The present disclosure presents new and innovative systems and methods for controlling a film transport apparatus. In one embodiment, a system is provided comprising a line scanning camera configured to capture images of film located in a scanning area, a supply reel motor that rotates a supply reel to supply film from the supply reel for scanning by the line scanning camera, a take-up reel motor that rotates a take-up reel to collect film on the take-up reel after scanning by the line scanning camera, and a plurality of capstan motors that rotate a plurality of capstans to direct the film from the supply reel, across the scanning area, and to the take-up reel. The system may also include a control system configured to receive position information from the supply reel motor, the take-up reel motor, and at least a subset of the plurality of capstan motors, dynamically adjust the position information by adding or subtracting adjustment information to the position information, provide the dynamically adjusted position information to a plurality of controllers, and generate control signals for the supply reel motor, the take-up reel motor, and the at least a subset of the plurality of capstan motors with the controllers.

In another embodiment, the control system is further configured to dynamically adjust the position information received from the subset of the plurality of capstan motors according to offset information.

In a further embodiment, the control system is configured to scan a target film with the line scanning camera, receive, from each of the subset of the plurality of capstan motors, a plurality of rotational position measurements at a plurality of times during the scan of the target film, and detect an inconsistency in the scan of the target film. The control system may also be configured to calculate an offset factor for an associated rotational position of at least one of the subset of the plurality of capstan motors based on (i) a measurement of the inconsistency and (ii) rotational position measurements associated with a time at which the inconsistency was scanned by the line scanning camera and add the offset factor to the offset information.

In yet another embodiment, the target film includes markings of a fixed thickness and/or a fixed distance apart and the inconsistency is a difference in thickness or distance apart for one or more of the markings.

In a still further embodiment, the control system is further configured to dynamically adjust position information from the supply reel motor based on a supply radius of the supply reel and dynamically adjust position information from the take-up reel motor based on a take-up radius of the take-up reel.

In another embodiment, the control system is further configured to receive (i) a supply rotation rate of the supply reel and (ii) a supply film speed across a first capstan of the plurality of capstans located closest to the supply reel, calculate the supply radius based on the supply rotation rate and the supply film speed, receive (i) a take-up rotation rate of the take-up reel and (ii) a take-up film speed across a second capstan of the plurality of capstans located closest to the take-up reel, and calculate the take-up radius based on the take-up rotation rate and the take-up film speed.

In a further embodiment, the control system is further configured to calculate the supply radius by dividing the supply film speed by the supply rotation rate and calculate the take-up radius by dividing the take-up film speed by the take-up rotation rate.

In yet another embodiment, the system further comprises a capstan motor profile generator used by at least one controller to generate control signals for a plurality of capstan motors.

In a still further embodiment, the control system is further configured to receive position information from each of the plurality of capstan motors.

In another embodiment, the control system is further configured to generate control signals for each of the plurality of capstan motors.

In a further embodiment, the position information includes one or more of: rotational speed measurements, rotational position measurements, and film speed measurements.

In yet another embodiment, (i) the position information from the supply reel motor and take-up reel motor include rotational speed measurements and (ii) the position information from the subset of the plurality of capstan motors include film speed measurements of the film across the subset of the plurality of capstan motors.

In a still further embodiment, the system further comprises a time of flight sensor configured to measure a height of a film loop in the system. The control system may also be further configured to dynamically adjust the position information from a capstan motor adjacent to the film loop based on the height of the film loop.

In another embodiment, a method is provided comprising receiving position information from a supply reel motor, a take-up reel motor, and at least a subset of a plurality of capstan motors, dynamically adjusting the position information by adding or subtracting adjustment information to the position information, providing the dynamically adjusted position information to a plurality of controllers, and generating control signals for the supply reel motor, the take-up reel motor, and the at least a subset of the plurality of capstan motors with the controllers.

In a further embodiment, the method further comprises scanning a target film with a line scanning camera, receiving, from each of a subset of the plurality of capstan motors, a plurality of rotational position measurements at a plurality of times during the scan of the target film, and detecting an inconsistency in the scan of the target film. The method may also comprise calculating an offset factor for an associated rotational position of at least one of the subset of the plurality of capstan motors based on (i) a measurement of the inconsistency and (ii) rotational position measurements associated with a time at which the inconsistency was scanned by the line scanning camera and adding the offset factor to offset information.

In yet another embodiment, the method further comprises dynamically adjusting position information from the supply reel motor based on a supply radius of the supply reel and dynamically adjusting position information from the take-up reel motor based on a take-up radius of the take-up reel.

In a still further embodiment, the method further comprises receiving (i) a supply rotation rate of the supply reel and (ii) a supply film speed across a first capstan of the plurality of capstans located closest to the supply reel, calculating the supply radius based on the supply rotation rate and the supply film speed, receiving (i) a take-up rotation rate of the take-up reel and (ii) a take-up film speed across a second capstan of the plurality of capstans located closest to the take-up reel, and calculating the take-up radius based on the take-up rotation rate and the take-up film speed.

In another embodiment, at least one of the controllers is configured to generate control signals for a plurality of capstan motors based on a single capstan motor profile generator.

In a further embodiment, the method further comprises receiving, from a time of flight sensor, a height measurement of a film loop and dynamically adjusting the operations sensor readings from a capstan motor adjacent to the film loop based on the height measurement.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

In order to accurately scan the film from the reel, the film reel scanner must accurately control the rate at which film passes through the scanner in order to meet certain data processing speed requirements, film tension requirements, and to reduce vibrations and other sources of interference that can negatively affect scanning accuracy.

Figure 1A:
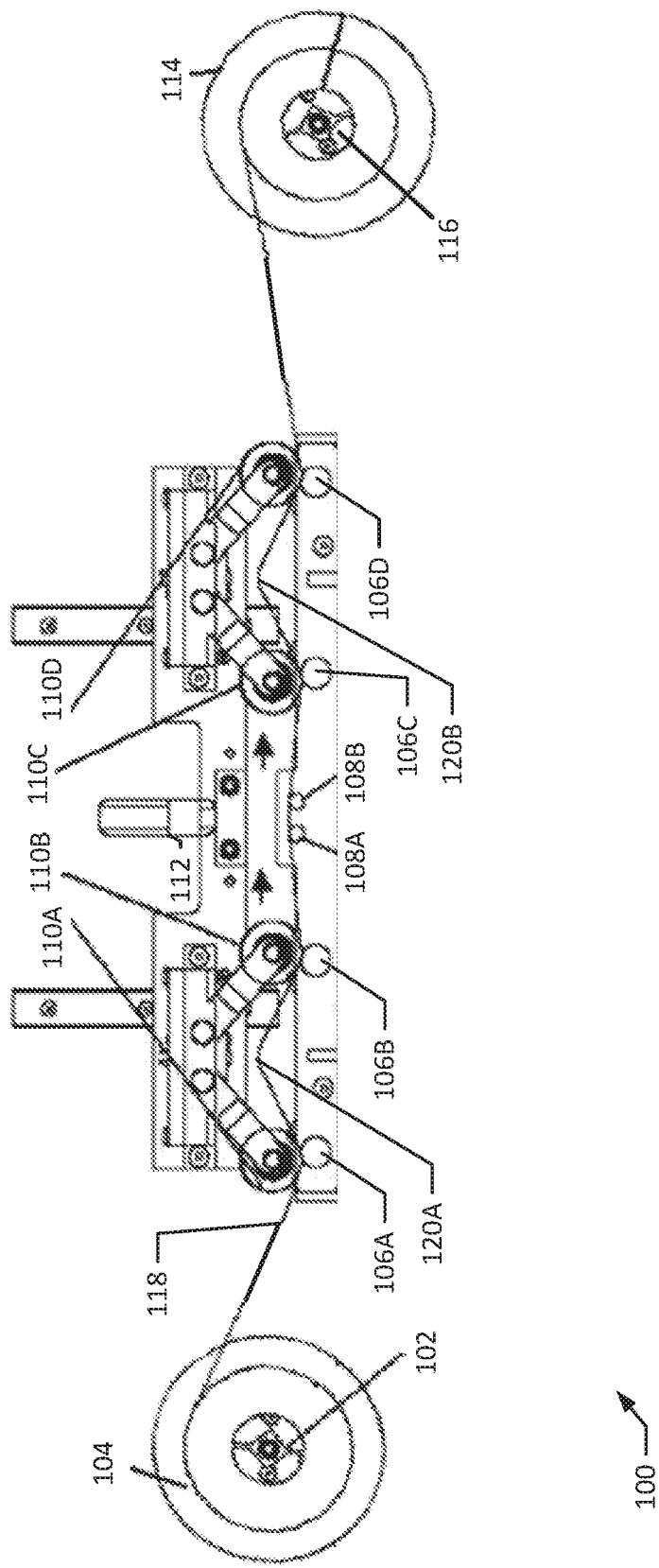
FIGS. 1A and 1B illustrate film reel scanners according to exemplary embodiments of the present disclosure.

FIG. 1A depicts a film reel scanner 100 according to an exemplary embodiment of the present disclosure. The film reel scanner 100 is configured to scan film 118 provided from a supply reel 104. The film 118 proceeds from the supply reel 104 between across the capstans 106A-B to a scanning area framed by roll bars 108A-B for scanning by the camera 112. The camera 112 may be a line image scanning camera configured to scan successive, single pixel-height lines of the film 118 as the film 118 moves across the scanning area. The camera 112 may capture color and/or black and white scans of the film 118. The film 118 then proceeds across the capstans 106C-D to the take-up reel 114, where the film is wound around the take-up reel 114 for storage and future archiving. The film 118 may be held against the capstans 106A-D by corresponding pinch rollers 110A-D. The capstans 106A-D may be actively controlled by capstan motors, while the pinch rollers 110A-D may roll passively based on the movement of the film between the capstans 106A-D and the pinch rollers 110A-D The film reel scanner 100 requires multiple controls to ensure sufficient scanning quality of the film 118. The supply reel 104 includes a supply reel motor 102 that controls the rate at which film 118 is fed from the supply reel 104 into the capstan 106A. Similarly, the take-up reel 114 includes a take-up reel motor 116 that controls the rate at which film 118 is received from the capstan 106D. Both motors 102, 116 may generally have to be balanced in order to keep a constant flow of film 118 through the scanner 100. Additionally, each capstan 106A-D may be controlled to balance the progression of film 118 through the film reel scanner 100. For example, each capstan 106A-D may include a corresponding capstan motor configured to control the rotation of the capstan 106A-D such that the film 118 progresses at the same rate through the scanner 100. Similarly, the capstans 106A-D may be configured to form film loops 120A-B. The film loops 120A-B may absorb vibrations within the scanner 100 and reduce non-linear movement of the film 118 in the scanning area between the scrollbars 108A-B. The motors 102, 116 and the capstans 106A-D may also be configured to maintain one or more tension requirements of the film 118. For example, the film 118 may require a minimum amount of tension within the scanner 100 in order to consistently and accurately move across the scanning area for scanning the camera 112 and to properly unspool film 118 from the supply reel 104 and to re-spool film 118 onto the take-up reel 114. However, the film 118 may also need to be kept below a maximum amount of tension in order to avoid tearing, warping, or other damage.

Figure 1B:
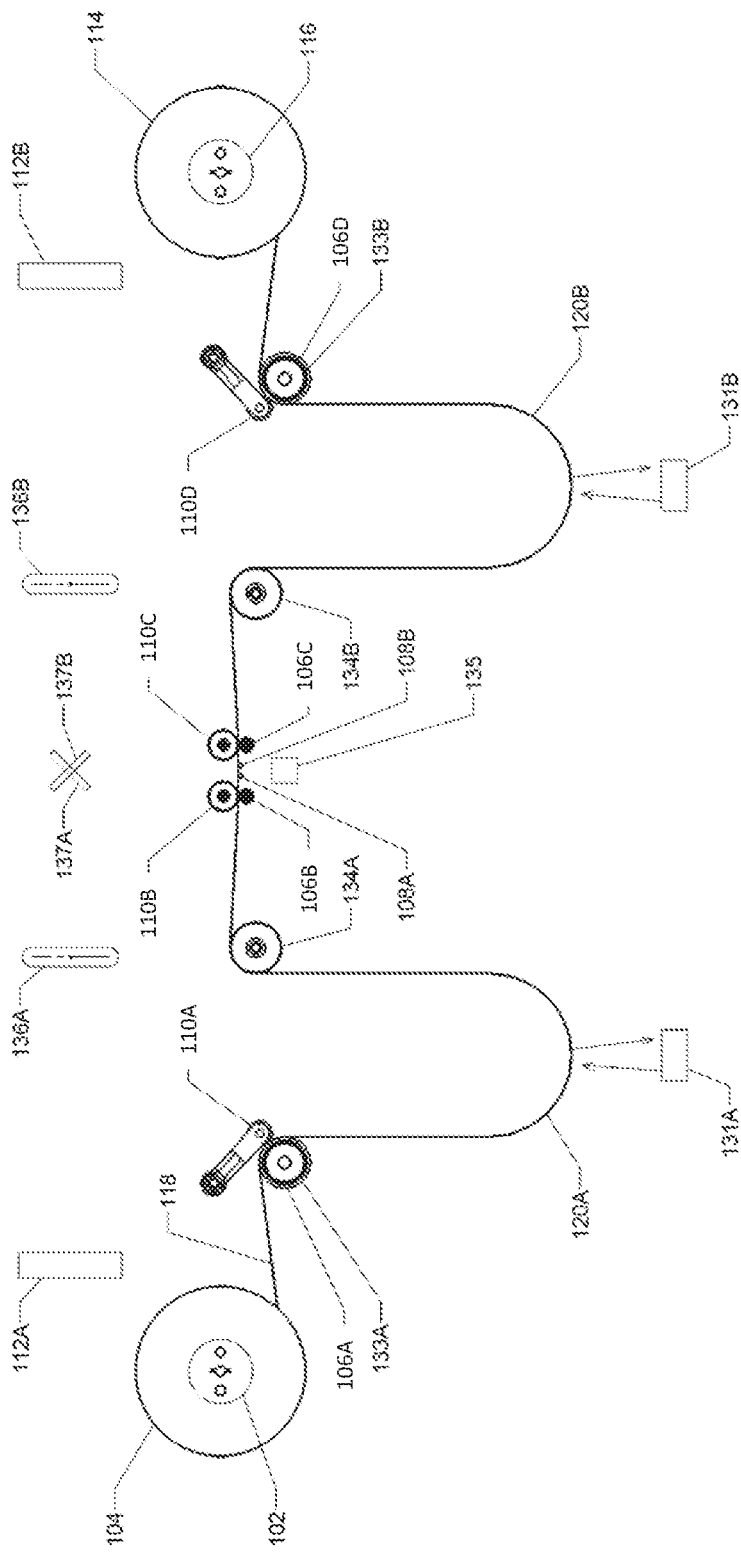

FIG. 1B depicts a second embodiment of the film reel scanner 150. In addition to the components described above in connection with the film reel scanner 100, the film reel scanner 150 includes idle rollers 134A-B, time of flight sensors 131A-B, a light source 135, lenses 136A-B, mirrors 137A-B, and capstan motors 133A-B, which are configured to drive the capstans 106A, 106D. The capstans 106A-D are also positioned differently, with the capstans 106A, D cooperating with the isle rollers 134A-B to generate the film loops 120A-B, and the capstans 106B, 106C positioned closer to the scanning area and the roll bars 108A-B. In certain implementations, the time of flight sensors 131A-B may be configured to cooperate with the capstans 106A-D to measure and maintain the size of the film loops 120A-B. Additionally, the mirrors 137A-B and the lenses 136A-B may be configured to redirect light from the light source 135 towards the cameras 112A-B for scanning purposes. In certain implementations, the light source 135 may be a strobing light source, such as a strobing LED.

Although FIGS. 1A and 1B depict specific configurations for the film reel scanner 100, 150, the methods and configurations described herein may also be used with other film reel scanner implementations. For example, alternative film reel scanners may include additional components and/or may exclude one or more components depicted in the system 100. In another example, one or more components of the system 100 may be rearranged or altered.

Film reel scanners typically rely on a controller to generate control signals for the motors (e.g., the reel motors 102, 116 and the capstan motors 133A-B). The controller in turn generally relies on profile generators. Typically, the controller has a separate profile generator for each moving controlled component. For example, in a typical implementation, the supply reel motor 102 and the take-up reel motor 116 may have separate profile generators to control the movement of the supply reel 104, the take-up reel 114, and each of the capstans 106A-D. Such implementations can drastically increase the complexity of the control system design. For example, each profile generator requires its own signal inputs, which may come from multiple locations within the scanner 100. Additionally, the extra profile generators increase the cost of the system 100.

Further, in order to meet certain tension requirements, conventional systems typically rely on either current-based or mechanical-based solutions to control the tension of film 118 being removed from the supply reel 104 and spooled onto the take-up reel 114. For example, the supply reel motor 102 and the take-up reel motor 116 may allow for torque control by varying the current provided to the motors 102, 116. Such solutions may be referred to as "static drag" control. However, if the film 118 were to break, such a control system would cause the reels 104, 114 to accelerate and spin out of control. Mechanical solutions, such as stationary rollers between the capstans 106A, 106D and the reels 104, 114 increase the number of components and complexity within the system, and create additional risks for mechanical failure. Additionally, such mechanical solutions are generally still susceptible to rapid acceleration if the film 118 breaks.

One solution to the above-identified problems is to provide a single controller for controlling multiple components within the scanner 100. For example, a single controller may be used to control the reels 104, 114 and one or more of the capstans 106A-D. The controller may be configured to produce a moving drag control loop that provides a constant drag force in either or both of a forward and reverse direction for a rotating object, such as the reels 104, 114 and the capstans 106A-D. The controller may also be configured to account for changing radii of the supply reel 104 and the take-up reel 114 as the film 118 is respectively removed from and added to the reels 104, 114. Further, the controller may be configured to account for one or more imperfections of the capstans 106A-D.

Figure 2A:
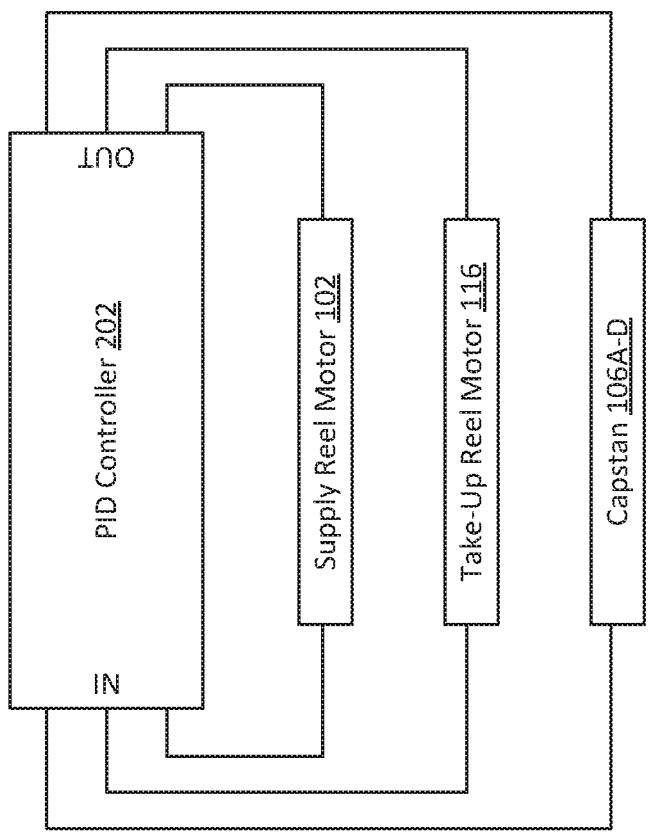
FIG. 2A illustrates a controller configuration according to an exemplary embodiment of the present disclosure.

FIG. 2A depicts an exemplary controller configuration according to an exemplary embodiment of the present disclosure. The controller configuration 200 includes a proportional-integral-derivative (PID) controller 202. The supply reel motor 102, the take-up reel motor 116, and the capstans 106A-D (e.g., the capstan motors 133A-B) are connected to both the input and the output of the PID controller 202. For example, the supply reel motor 102, the take-up reel motor 116, and the capstans 106A-D may each be connected to one or more of the proportional input, the integral input, and the derivative input of the PID controller 202. Similarly, the supply reel motor 102, the take-up reel motor 116, and the capstans 106A-D may receive control signals from the output of the PID controller 202. As discussed above, the control signals may cause the supply reel motor 102, the take-up reel motor 116, and the capstans 106A-D to rotate such that the film 118 moves through the scanner 100 according to desired performance requirements (e.g., speed requirements, vibration-reduction requirements, and tension requirements).

Figure 2B:
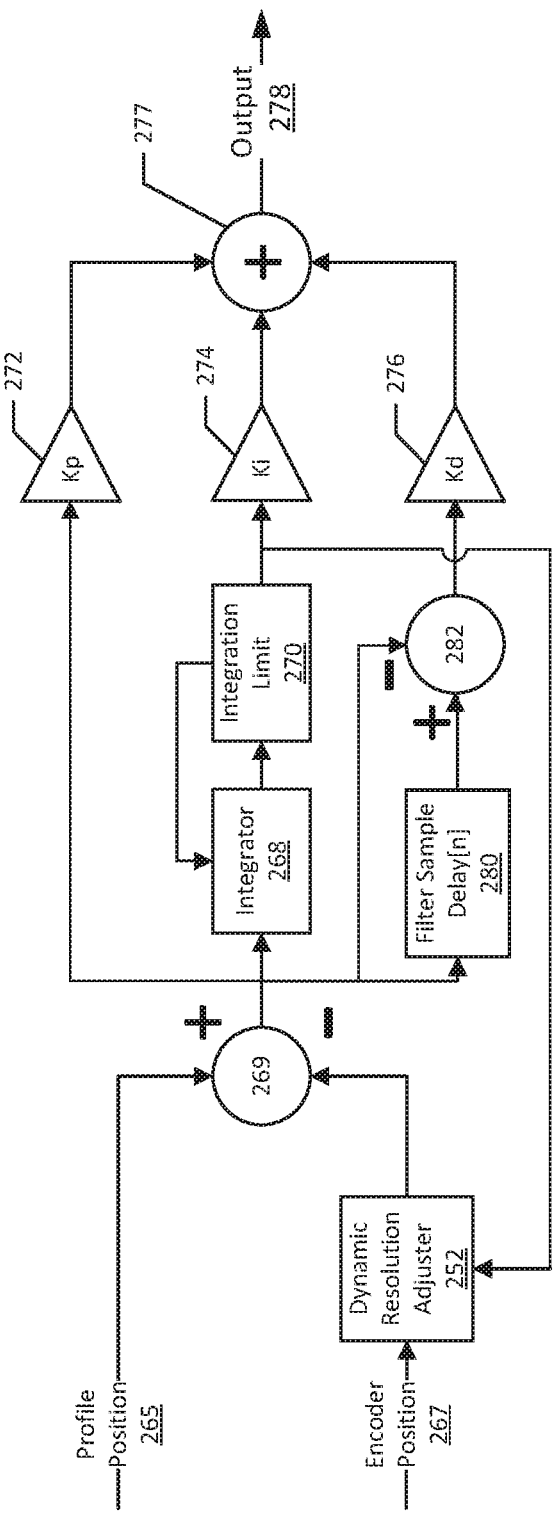
FIG. 2B illustrates a controller according to an exemplary embodiment of the present disclosure.

FIG. 2B depicts the controller 202 according to an exemplary embodiment of the present disclosure. In particular, FIG. 2B depicts an internal connection scheme of the controller 202, such as an internal connection scheme to generate output signals based on input signals received from the supply reel motor 102, the take-up reel motor 116, and the capstans 106A-D. In the depicted configuration, the input signals may be received as an encoder position 267. For example, the supply reel motor 102, take-up reel motor 116, and capstan motors 133A-B may include an encoder that encodes the current position of the motors 102, 116, 133A-B as one of a plurality of counts (e.g., 120,000 counts). In such implementations, the input signal may be received from the motors 102, 116, 133A-B as a count from the encoder of each motor at the encoder position 267. The controller 202 may be connected such that the output signal 278 is then directed to the motor. The specific configuration depicted in FIG. 2B may be an internal connection scheme for one input/output signal pairing. Accordingly, the depicted connection scheme may be similarly repeated for each motor 102, 116, 133A-B.

The controller 202 receives the encoder position 267 from the motor 102, 116, 133A-B at the dynamic resolution adjuster 252. The dynamic resolution adjuster 252 may be configured to convert a count received from the encoder of the motor 102, 116, 133A-B into a current position of the motor 102, 116, 133A-B. In implementations where the encoder position 267 is received from a capstan motor 133A-B, the dynamic resolution adjuster 252 may be configured to dynamically adjust the encoder position 267 to account for inconsistencies in the surface of capstan 106A-D, as described further below. In implementations where the encoder position 267 is received from a reel motor 102, 116, the dynamic resolution adjuster may be configured to dynamically adjust the encoder position 267 to account for a changing radius of the associated reels 102, 114. Additionally, the dynamic resolution adjuster 252 may receive feedback reflecting current tension in the film 118 and may dynamically adjust the encoder position 267 to account for the current tension. In particular, as depicted, the dynamic resolution adjuster 252 may receive this input from the output of the integration limit 270.

The output of the dynamic resolution adjuster 252 may then be subtracted from the profile position 265 at the summing point 269 to calculate a delta position of the motor 102, 116, 133A-B. The profile position 265 may be received by a profile generator, such as a profile generator for the reel motors 102, 116 or the capstan motors 133A-B. The delta position is then provided to the proportional gain 272 for subsequent summing at the summing point 277. The delta position is also provided to the integrator 268, which incorporates a feedback signal from the integration limit 270 and provides the integrated delta position to the integration limit 270. The resulting output from the integration limit 270 may then reflect the tension in the film 118 and may be provided to the dynamic resolution adjuster 252 and the integral gain 274. From the integral gain 274, the film tension may then be provided to the summing point 277 for summing to form the output signal 278. The delta position is also provided to a filter sample delay 280, which introduces a delay to the delta position. The delayed delta position is then passed to the summing point 282, where the delta position is subtracted from the delayed delta position and the result is passed to the differential gain 276. The result is then provided to the summing point 277 for summing to form the output signal 278.

The internal configuration depicted in FIG. 2B may reduce the number of profile generators required. For example, by connecting the output from the integration limit 270, the dynamic resolution adjuster 252 can receive internal signals from the controller 202's PID loop to determine the internal measurements regarding the tension of the film. Such internal signals may help consolidate the number of profile generators, e.g., by only requiring a single profile generator to control both reel motors 102, 116.

Figure 2C:
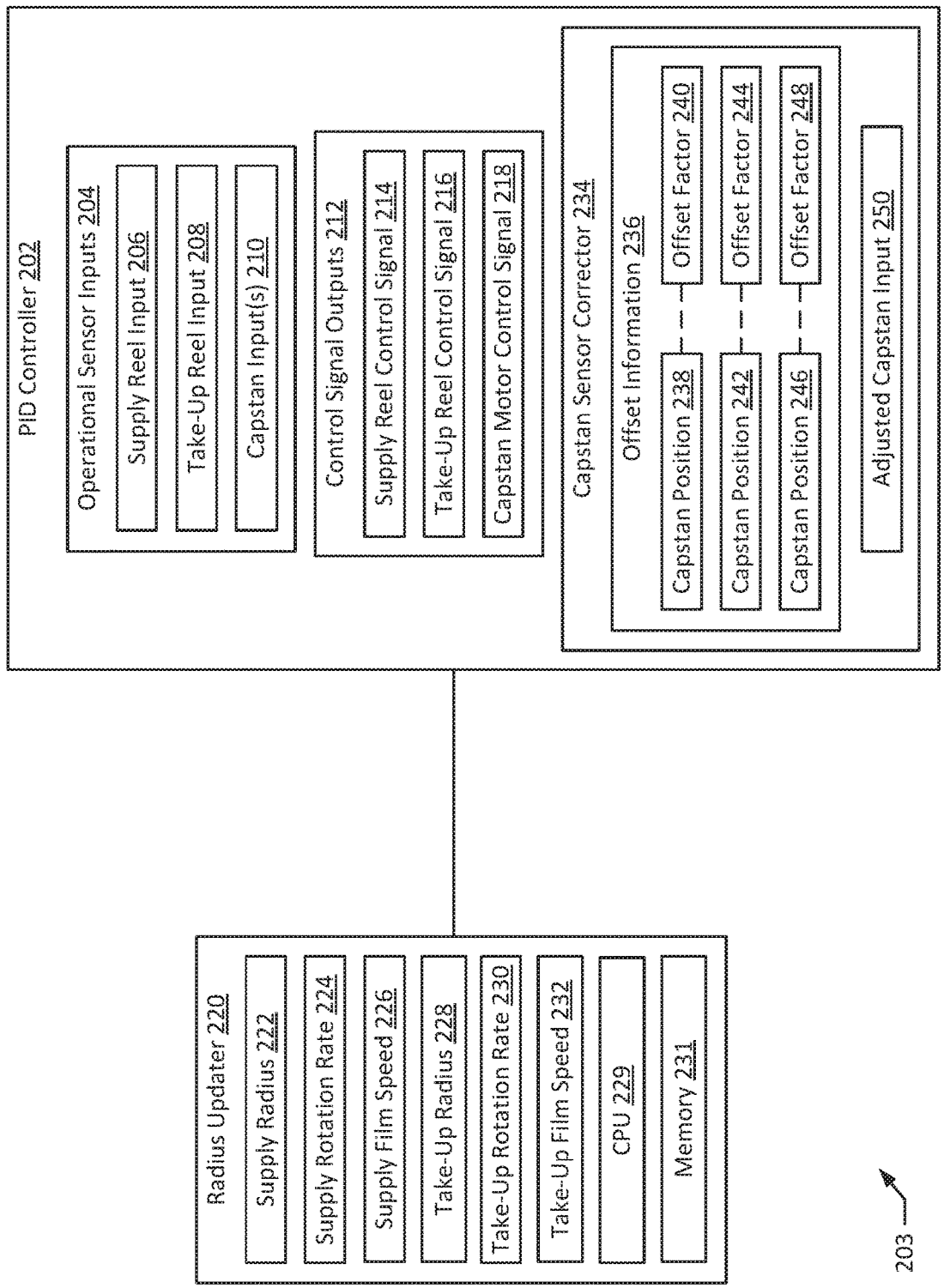
FIG. 2C illustrates a system according to an exemplary embodiment of the present disclosure.

FIG. 2C depicts a system 203 according to an exemplary embodiment of the present disclosure. The system 203 includes a radius updater and the PID controller 202. The PID controller 202 includes operational sensor inputs 204, control signal outputs 212, and a capstan sensor corrector 234. The operational sensor inputs 204 are configured to receive a supply reel input 206 from the supply reel motor 102, a take-up reel input 208 from the take-up reel motor 116, and one or more capstan inputs 210 from the capstans 106A-D. The operational sensor inputs 204 may include one or more proportional inputs, integral inputs, and derivative inputs. The control signal outputs 212 configured to output control signals generated by the PID controller 202. For example, the PID controller may generate a supply reel control signal 214 for the supply reel motor 102, a take-up reel control signal 216 for the take-up reel motor 116 and one or more capstan motor control signals 218 for the capstans 106A-D and associated capstan motors 133A-B. In certain implementations, alternative control signal generation may be possible. For example, in certain implementations, the control signal outputs 212 may include additional capstan motor control signals 218, or no capstan motor control signals 218.

The radius updater 220 may be configured to update a radius measurement of one or both of the supply reel 104 and the take-up reel 114. For example, the radius updater 220 may calculate a spool radius 222 of the supply reel 104 and a take-up radius 228 of the take-up reel 114. As film 118 unspools from the supply reel 104, the radius of the supply reel 104 may decrease. Similarly, as film 118 spools onto the take-up reel 114, the radius of the take-up reel may increase. In certain implementations, the supply reel control signal 214 in the take-up reel control signal 216 may be generated to cause the supply reel 104 and the take-up reel 114 to rotate at a designated rotational speed (e.g., a specified number of revolutions per minute). For a given rotational speed, the speed of the film 118 coming off of or onto a reel 104, 114 will change with changes to the radius of the reel 104, 114. Therefore, the reel control signals 214, 216 may need to be adjusted based on the changing radius. Relatedly, the reel control signals 214, 216 may be torque-controlled (e.g., controlled to rotate with a designated level of torque), which may cause differing levels of tension to be applied to the film 118 as the radius of the reel 104, 114 changes. For example, as the radius of the reel 104, 114 increases, force applied to the film 118 will also increase for identical levels of torque. As another example, as the radius of the reel 104, 114 decreases, force applied to the film 118 will decrease for identical levels of torque. Therefore, in order to meet the operational requirements of the scanner 100, the reel control signals 214, 216 may need to be adjusted to account for the radius of the reels 104, 114.

In calculating the radius of the reels 104, 114, the radius updater 220 may analyze signals received from the supply reel motor 102 and the take-up reel motor 116. For example, the radius updater 220 may analyze the supply reel input 206 and the take-up reel input 208, or a portion thereof. In particular, the radius updater 220 may analyze a supply rotation rate 224 received from the supply reel input 206 and a take-up rotation rate 230 received from the take-up reel input 208. Signals received from the capstans 106A-D, such as signals received at the capstan inputs 210. For example, the radius updater 220 may analyze a supply film speed 226 received from the capstan 106A located closest to the supply reel 104 and a take-up film speed 232 received from a capstan 106D located closest to the take-up reel 114. The film speeds 226, 232 may be determined based on a rotational speed of the capstans 106A, 106D. For example, the capstans 106A, 106D may have a fixed circumference to which the capstans 106A, 106D are machined with a tight tolerance. Accordingly, a rotational rate of the capstans 106A, D may directly correspond to a known rate of speed for the film 118 across the capstan 106A, 106 D. As another example, for a capstan 106A, 106D with a 2-inch circumference, the film speeds 226, 232 may indicate (e.g., by multiplying the known circumference by an angular speed of the capstan 106A, 106D. In particular, if a capstan 106A, 106D has a known circumference of 2 inches and rotates 120 times per second capstan 106A, 106D may indicate a film speed 226, 232 of 240 inches/second.

The radius updater 220 may calculate the radii 222, 228 based on the received rotation rates 224, 230 and film speeds 226, 232. For example, the radius updater 220 may calculate the supply radius 222 by dividing the supply film speed 226 by the supply rotation rate 224 and may calculate the take-up radius 220 by dividing the take-up film speed 232 by the take-up rotation rate 230. Continuing the previous example, if the take-up film speed 232 indicates a speed of 240 inches/second and the take-up rotation rate 230 indicates 360 rotations per minute (rpm) (e.g., 6 rotations per second), a circumference of the take-up reel 114 may be calculated as (240 inches/second)/(6 rotations/second)=40 inches. The take-up radius 228 may then be determined as 40 inches/ $2\pi$=~6.37 inches. The supply radius 222 may be similarly calculated based on the supply rotation rate 224 and the supply film speed 226. The PID controller 202 may then adjust the supply reel control signal 214 based on the supply radius 222 and may adjust the take-up reel control signal 216 based on the take-up radius 228. For example, if specific tension requirements are desired within the film 118, the PID controller 202 may adjust the reel control signals 214, 216 based on the determined radii 222, 228. In particular, the PID controller 202 may divide a desired film tension at the supply reel 104 by the supply radius 222 to determine a tension signal for inclusion within the supply reel control signal 214 to provide accurate torque-controlled tension from the supply reel motor 102. The PID controller 202 may similarly adjust the take-up reel control signal 216 for desired tension requirements at the take-up reel 114.

The radius updater 220 may be configured to update the supply radius 222 and the take-up radius 228 at regular intervals. For example, the radius updater 220 may update the radii 222, 228 based on a number of rotations of the corresponding reel 102, 114 (e.g., once every rotation or every 10 rotations or every ¼ of a rotation) and/or may update the radii 222, 228 at regular time intervals (e.g., once every second, every 10 seconds, every minute).

The CPU 229 and the memory 231 may implement one or more aspects of the radius updater 220. For example, the memory 231 may store instructions which, when executed by the CPU 229 may perform one or more of the above-described operational features of the radius updater 220.

The capstan sensor corrector 234 may be configured to calculate offset information 236 for one or more of the capstans 106A-D. The capstan sensor corrector 234 may then use the offset information 236 to adjust capstan inputs 210 and determine an adjusted capstan input 250. For example, if the capstan sensor corrector 234 determines offset information 236 for the capstan 106A, the capstan sensor corrector 234 may apply corresponding offset information 236 for capstan inputs 210 received from the capstan 106A.

As depicted, the offset information 236 stores a plurality of offset factors 240, 244, 248 for corresponding capstan positions 238, 242, 246. For example, the capstan positions 238, 242, 246 may correspond to one or more rotational positions of the capstan 106A-D. Certain capstan positions 230, 242, 246 may correspond to imperfections on the capstan's surface, which may cause a differing amount of film to proceed through the scanner 100. The capstan sensor corrector 234 may store offset factors 240, 244, 248 for such capstan positions 238, 242, 246 in order to adjust the capstan motor control signal 218. For example, if a particular capstan position 238 of the capstan 106A corresponds to an imperfection causing extra film 118 to proceed through the scanner 100, the corresponding offset factor 240 may scale control signals 218 for that the capstan 106A-D rotates slower, keeping the speed of the film 118 constant over a complete rotation of the capstan 106A. In certain implementations, the offset information 236 may be stored as a lookup table for each capstan position 238, 242, 246 of the capstan 106A-D. In certain implementations, each rotational capstan position 238, 242, 246 may correspond to an individual encoder count of an encoder attached to the motors controlling the capstans 106A-D. For example, the encoder may include 120,000 counts per revolution. In such implementations, offset factors 240, 244, 248 may be stored for each count of the encoder in a lookup table. Applying the offset factor to each rotational capstan position 238, 242, 246 may translate the capstan position 238, 242, 246 to an actual, corrected position of the contact position of the corresponding capstan 106A-D.

In certain implementations, the offset information 236 may be generated by a computer system, such as by a CPU and a memory within a computer system. In such implementations, the offset information 236 may be generated by the computer system and then provided to the capstan sensor corrector 234 of the PID controller 202. For example, the offset information 236 may be stored as a lookup table stored on an FPGA implementing or connected to the PID controller.

Figure 2D:
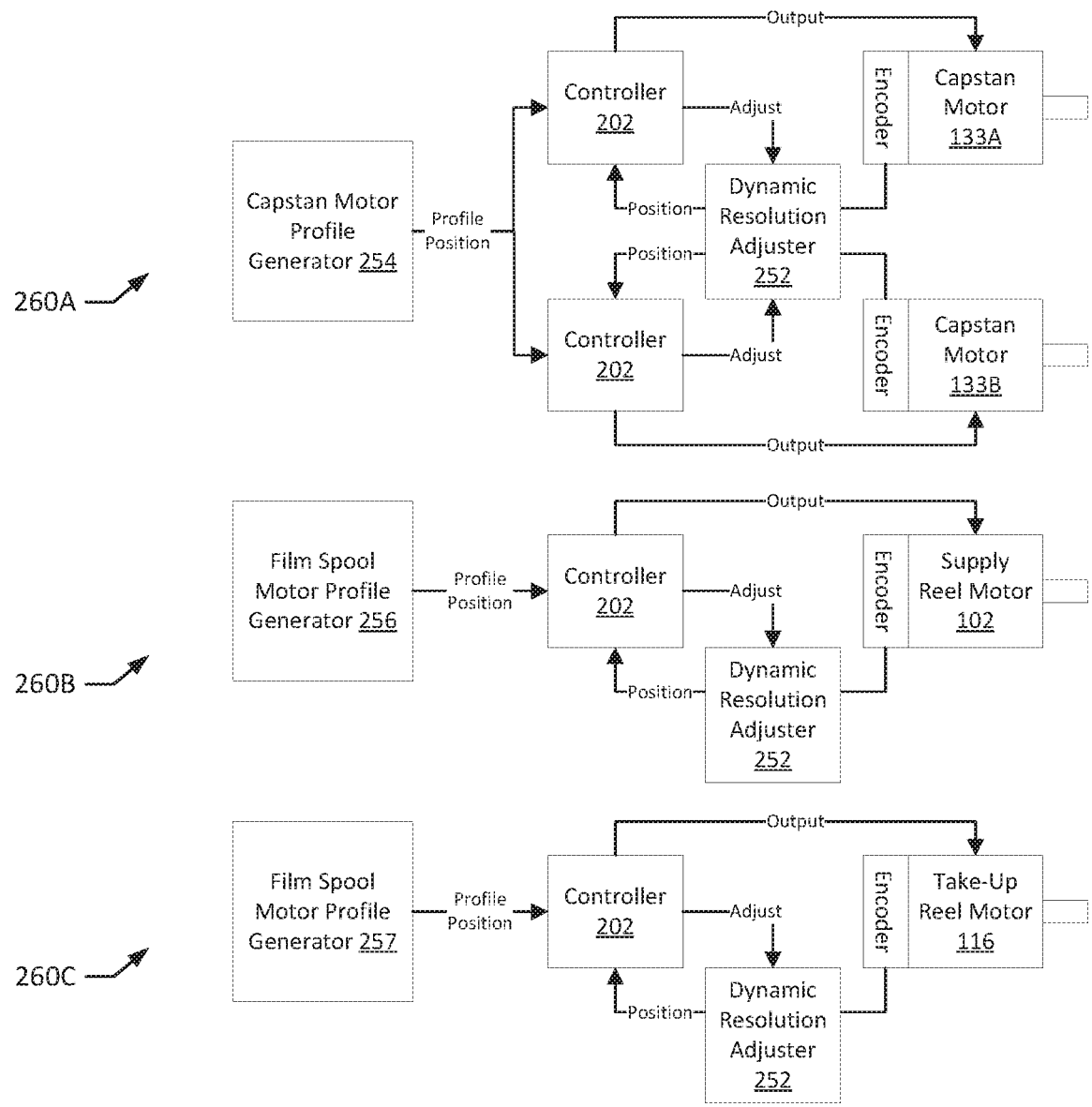
FIGS. 2D and 2E illustrate exemplary controller configurations according to exemplary embodiments of the present disclosure.
Figure 2E:
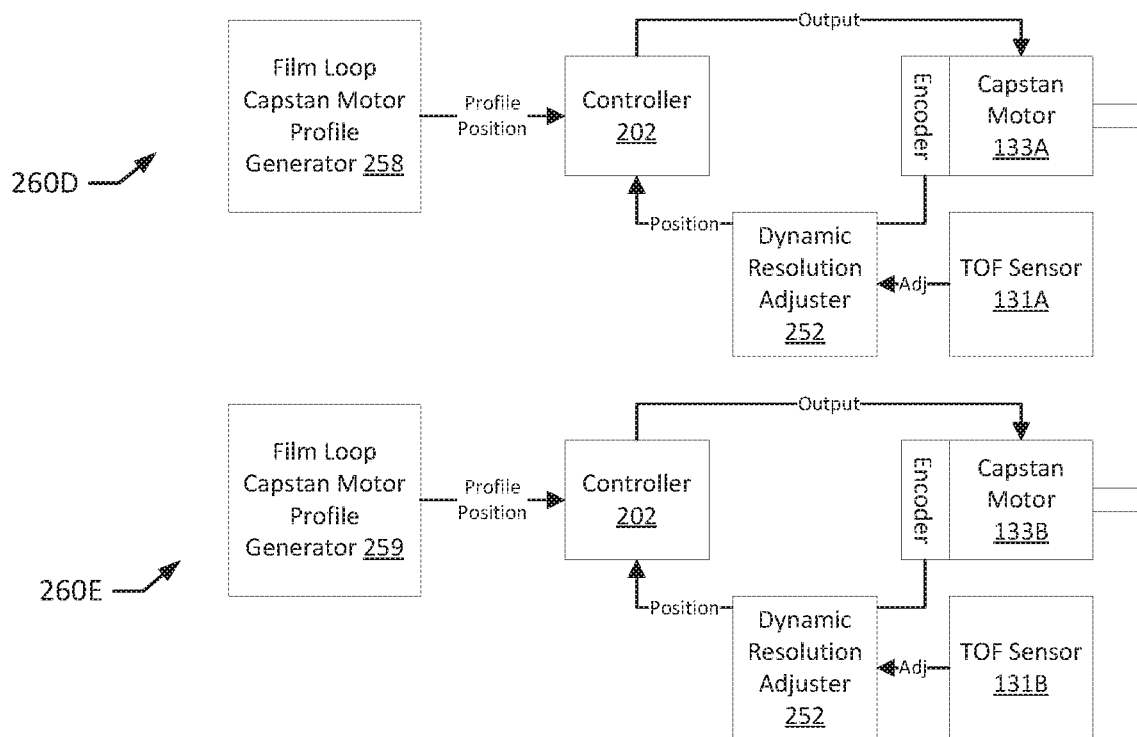

FIGS. 2D and 2E depict exemplary controller configurations 260A-E according to exemplary embodiments of the present disclosure. The controller configurations 260A-E depict exemplary configurations for connecting controllers 202 to additional system components to generate and provide control signals to motors 102, 116. For example, the controller configurations 260A-E may enhance the internal configuration depicted in FIG. 2B.

In configuration 260A, two controllers 202 connect to a capstan motor profile generator 254 (e.g., at the profile position input 265). The controllers 202 also receive position inputs from the dynamic resolution adjuster 252 and provide adjustment information to the dynamic resolution adjuster 252, such as information regarding the film tension from the integration limit 270. For the capstan motors 133A-B, the dynamic resolution adjuster 252 may also adjust the capstan encoder position based on offset information 236 from the capstan sensor corrector 234. The dynamic resolution adjuster 252 may receive encoder position information from the encoders of the capstan motors 133A-B and, based on the adjustment information from the controller 202, may generate an adjusted position for use by the controllers 202. Based on the position information from the dynamic resolution adjuster 252 and the profile position from the capstan motor profile generator 254, the controllers 202 then generate the output signals 278, which are provided to the respective capstan motors 133A-B.

The configurations 260B, 260C depict similar configurations for controllers 202, but to control the film spool motors 102, 116. In particular, the controllers 202 are similarly connected to the dynamic resolution adjuster 252, but each film spool motor 102, 116 has its own corresponding film spool motor profile generator 256, 257. In addition, for the film spool motors 102, 116, the dynamic resolution adjuster 252 may account for changes in the radius of the supply and take-up reels 102, 114 using the radius updater 220. The separate film spool motor profile generators 256, 257 may be necessary because the supply reel 102 and take-up reel 114 both have changing radii to be separately accounted for.

The configurations 260D, E depict another capstan control configuration for the controller 202. Similar to the configuration 260A, the configurations 260D, 260E include controllers 202 connected to the dynamic resolution adjuster 252 and the capstan motors 133A-B. However, each capstan motor 133A-B has its own corresponding film loop capstan motor profile generator 258, 259. Also, the dynamic resolution adjuster 252 receives adjustment information from a time of flight sensor 131A-B. Based on the position information received from the dynamic resolution adjuster 252 and derived from the time of flight sensor 131A-B adjustment information, the controllers 202 may generate output signals for the capstan motors 133A-B such that the height of the film loops 120A-B is held constant. Because the height of each film loop 120A-B can change independently, separate film loop capstan motor profile generators 258, 259 may be necessary. In certain implementations, configuration 260A may be used to control the capstans 1106B, C nearest the scanning area, while configurations 260D, E may be used to control the capstans 106A, D nearest the reels 104, 114.

Figure 3B:
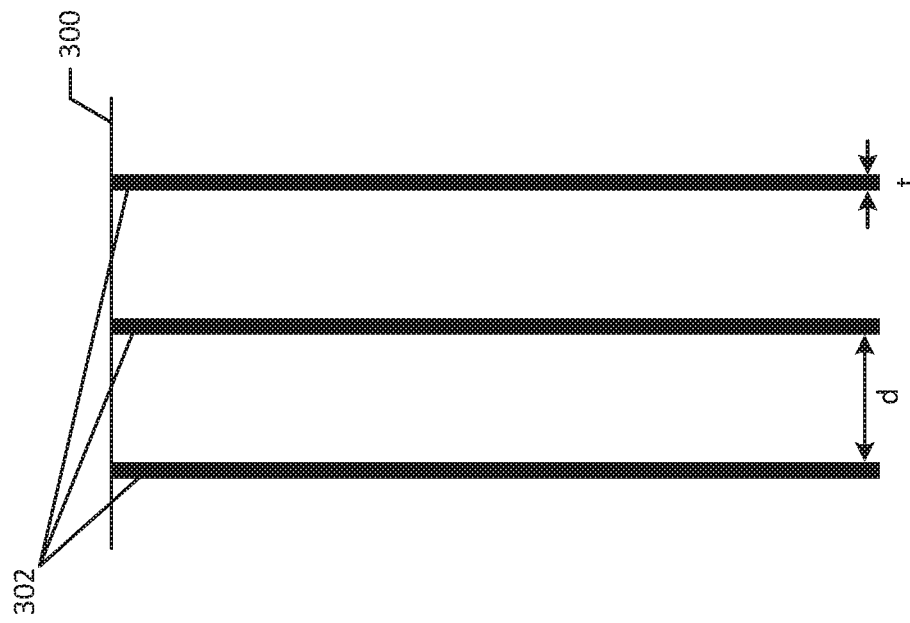
FIGS. 3A-3C illustrate target film according to an exemplary embodiment of the present disclosure.
Figure 3A:
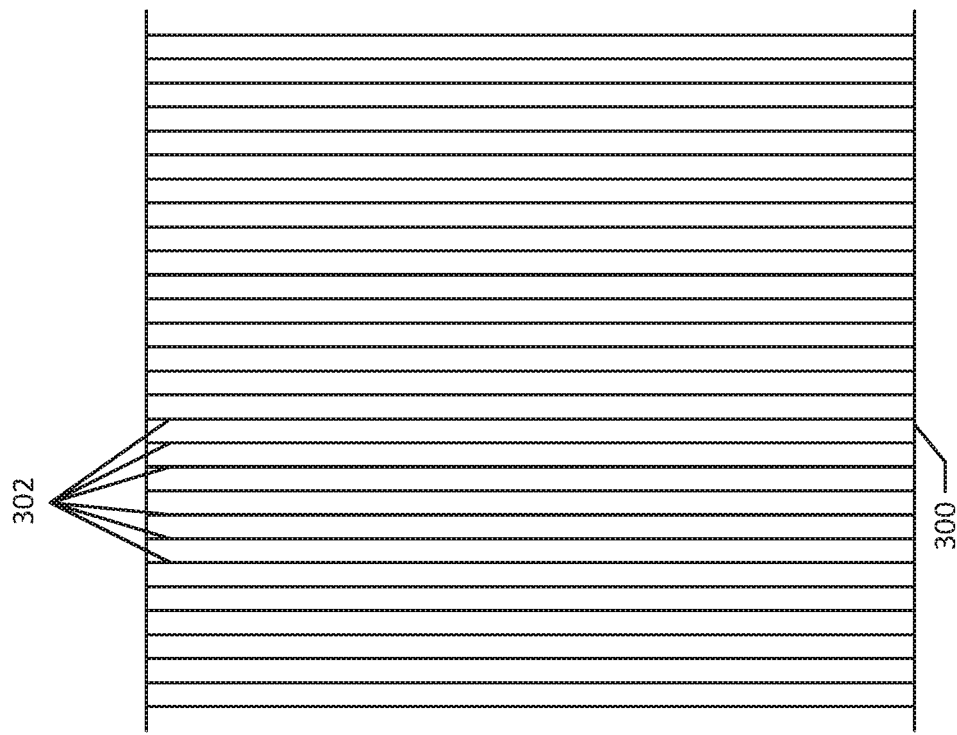

FIGS. 3A and 3B depict target film 300 according to an exemplary embodiment of the present disclosure. The target film 300 may be used to detect one or more inconsistencies in the surface of the capstans 106A-D. For example, the target film 300 may be scanned by the scanner 100 in order to detect inconsistencies of the capstans 106A-D by comparing a length of target film 300 scanned with a length of target film 300 determined from capstan 106A-D sensor readings. The target film 300 includes a plurality of features 302, which may be used by the capstan sensor corrector 234 to detect the length of target film 300 scanned by the scanner 100. For example, the features 302 may be lines as depicted that span the width of the target film 300. As depicted in FIG. 3B, the features 302 may have a specific distance d and thickness t that may be used to determine the length of target film 300 scanned. For example, the length of target film 300 may be determined by counting the number of features 302 that have been scanned and by multiplying the counted number of features 302 by the distance d and the thickness t to arrive at a total length of target film 300 scanned.

Figure 3C:
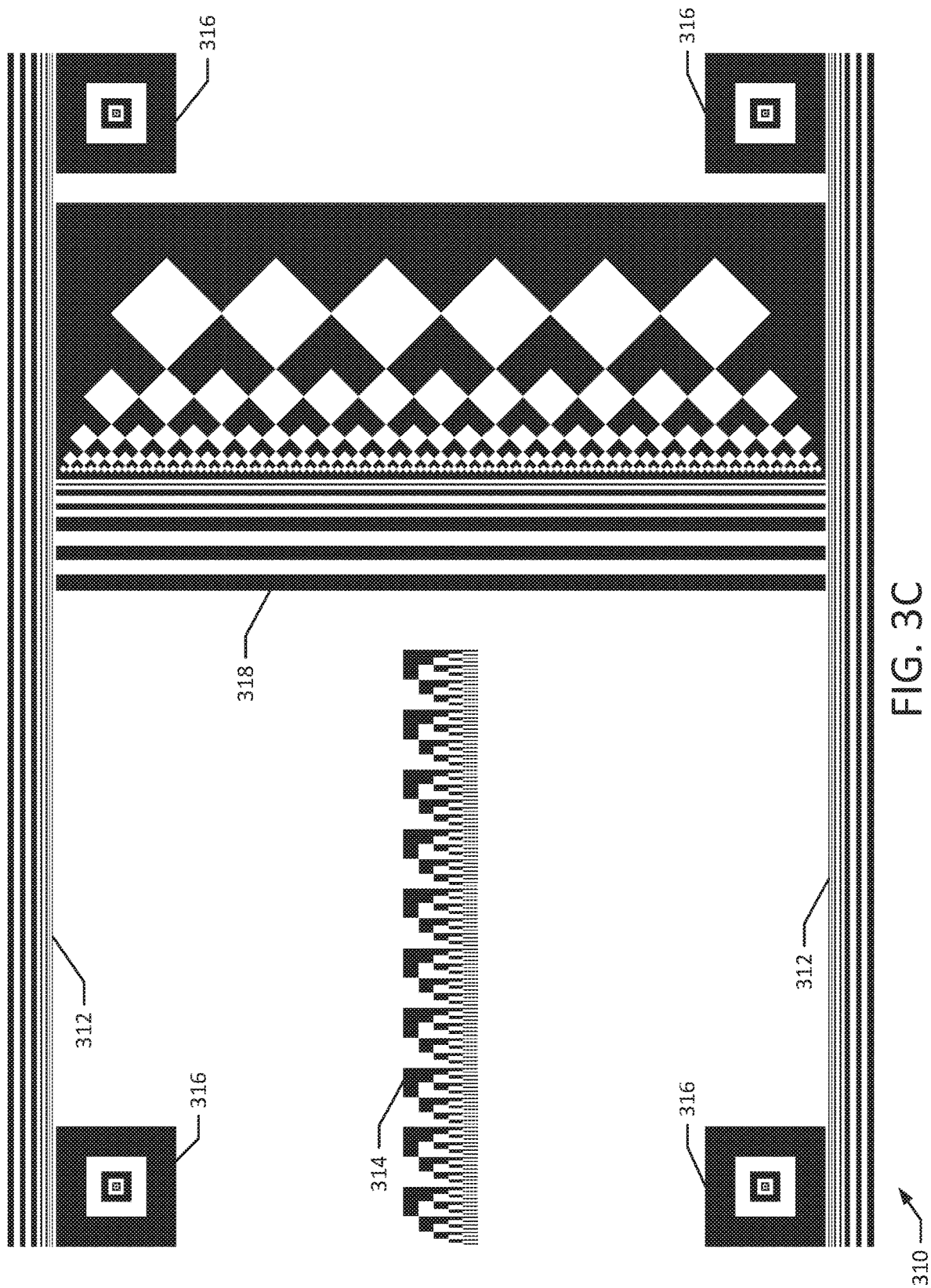

Although the features 302 depicted in FIGS. 3A and 3B are lines, other feature geometries are possible. For example, the features 302 may include shapes or patterns with known dimensions. FIG. 3C depicts an example target film 310 with such alternative patterns. The target film 310 includes horizontal alignment rulings 312, capstan calibration rulings 314, corner alignment features 316, and a camera alignment grid 318. The capstan calibration rulings 314 include multiple features, including lines of varying thicknesses. The pattern of these lines may be useful in detecting inconsistencies of different sizes. Additionally, by providing features of differing sizes, inconsistencies of different sizes can also be detected.

Figure 4:
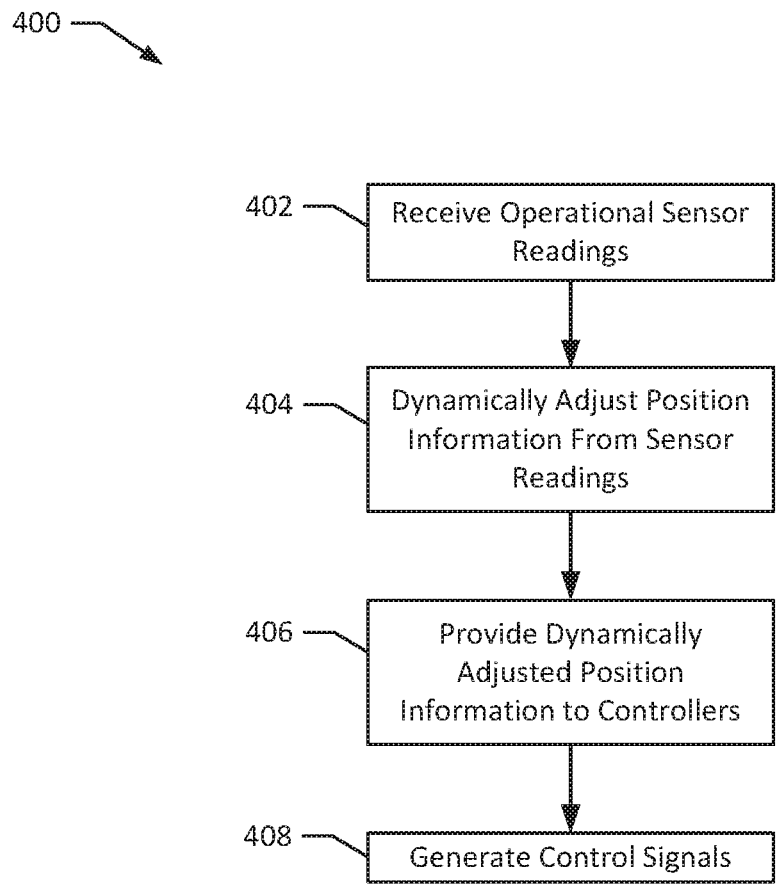
FIG. 4 illustrates a method according to an exemplary embodiment of the present disclosure.

FIG. 4 depicts a method 400 according to an exemplary embodiment of the present disclosure. The method 400 may be performed to generate control signals for one or more of the supply reel motor 104, the take-up reel motor 116 and/or one or more capstan motors for the capstans 106A-D. For example, the method may be performed by the system 203. The method 400 may be implemented at least in part on a computer system. For example, the method 400 may be implemented at least in part by a set of instructions stored on a computer readable medium that, when executed by a processor, cause the computer system to perform at least a portion of the method. Although the examples below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional.

The method 400 may begin with receiving one or more operational sensor readings (block 402). For example, the PID controller 202 may receive one or more operational sensor readings at the operational sensor inputs 204. In particular, the PID controller 202 may receive one or more of a supply reel input 206, a take-up reel input 208, and a capstan input 210. For each of these inputs 206, 208, 210, the PID controller 202 may receive rotational speed measurements, rotational position measurements, and film speed measurements. In particular, the specific type of operational sensor data inputs may differ for each input 206, 208, 210. For example, the supply reel input 206 and the take-up reel input 208 may include rotational speed measurements, while the capstan input 210 may include rotational position measurements and film speed measurements.

A dynamic resolution adjuster 252 may then dynamically adjust the operational sensor readings (block 404). The dynamic resolution adjuster 252 may dynamically adjust the operational sensor readings by adding or subtracting adjustment information to the operational sensor readings. For example, when operational sensor readings are received from a capstan motor 133A, 133B as in configuration 260A, the dynamic resolution adjuster 252 may add or subtract offset information 236 from the capstan sensor corrector for the corresponding capstan position 238, 242, 246 of the capstan motor 133A, 133B. In other implementations, when operational sensor readings are received from a reel motor 102, 116, the dynamic resolution adjuster 252 may add or subtract offset information based on a corresponding supply radius 222 or take-up radius 228 from the radius updater 220. In still further implementations, where the system 203 includes time of flight sensors 131A-B and where operational sensor readings are received from capstans alongside film loops 120A-B, the dynamic resolution adjuster 252 may add or subtract a height of a corresponding film loop as measured by the time of flight sensors 131A-B (i.e., may subtract a height of the film loop 120A as measured by the time of flight sensor 131A from operational sensor readings from the capstan motor 133A). Such implementations may reduce resource consumption and still allow for correction even when a motor 102, 116, 133A-B is not moving. For example, even if a motor 102, 116, 133A-B providing operation sensor readings is not moving, the dynamically adjusted information may still show movement if correction is required, allowing the controller 202 to continue processing as below. The weighting of the adjustment information added or subtracted to the operational sensor readings may be changed to account for different implementations, installations, and use cases.

The dynamic resolution adjuster 252 may then provide the dynamically adjusted position information to the controllers (block 406), as shown in the configurations 260A-E. The controllers 202 may then generate the control signals 214, 216, 218 as discussed above (block 408). As depicted above, the controller 202 may be implemented as a PID controller and the integral value derived from operational signals received from a motor 102, 116, 133A-B may be calculated by the controller 202 and provided to the dynamic resolution adjuster 252. Further, by subtracting the integral value from each motor 102, 116, 133A-B, the dynamic resolution adjuster 252 may estimate a dynamic load for the motor, and corresponding tension on the film 118. Additionally, the delta position and a programmable offset may be provided to the dynamic resolution adjuster 252 may enable the controllers 202 to generate control signals 214, 216, 218 that keep tension constant within the film 118.

Figure 5:
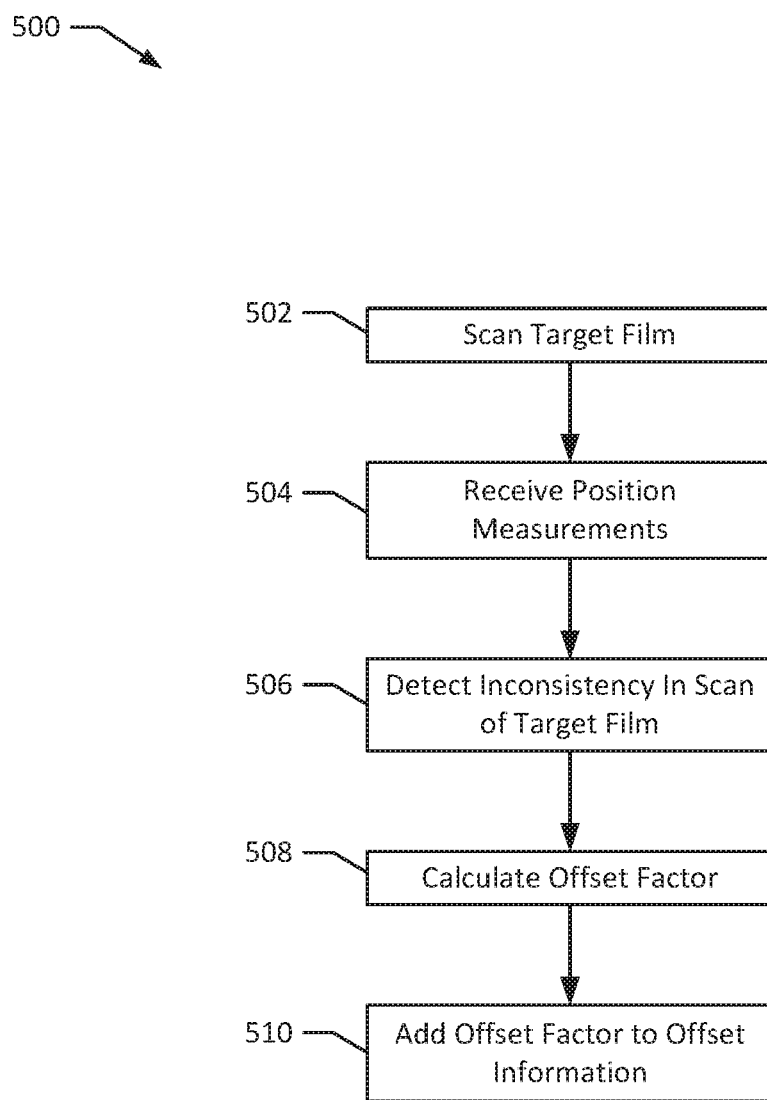
FIG. 5 illustrates a method according to an exemplary embodiment of the present disclosure.

FIG. 5 depicts a method 500 according to an exemplary embodiment of the present disclosure. The method 500 may be performed to determine offset information 236 for a capstan 106A-D. For example, the capstan sensor corrector 234 may perform the method 500 to determine the offset information 236 based on a target film 300. The method 500 may be implemented at least in part on a computer system. For example, the method 500 may be implemented at least in part by a set of instructions stored on a computer readable medium that, when executed by a processor, cause the computer system to perform at least a portion of the method. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

The method 500 begins with the scanner 100 scanning a target film 300, 310 (block 502). For example, the target film 300 may be provided in a certain length with pre-defined features 302. The scanner 100 may scan all or part of the target film 300. In scanning the target film 300, 310, the scanner 100 may determine a length of target film 300, 310 scanned based on the features 302, as described above. The PID controller 202 and/or the capstan sensor corrector 234 may receive the results of scanning the target film 300, 310 (e.g., the determined length of target film 300, 310 scanned).

The capstan sensor corrector 234 may then receive position measurements (block 504). For example, the capstan sensor corrector 234 may receive rotational position measurements from the capstan input 210 via the operational sensor input 204 of the PID controller 202. The rotational position measurements may indicate a degree of rotation of a corresponding capstan 106A-D. In certain implementations, the rotational position measurements may be on a per-degree basis (e.g., out of 360° of rotation). In other implementations, the rotational position measurements may be subdivided into additional or fewer segments (e.g., 10, 500, 10,000, 120,000 segments of rotation), such as a count received from an encoder of the capstan 106A-D.

The capstan sensor corrector 234 may then compare the determined length of scanned target film 300, 310 to the position measurements to detect one or more inconsistencies (block 506). For example, the capstan sensor corrector 234 may detect that, for a certain rotational position or transition between rotational positions, a set amount of target film 300, 310 is expected to pass through the scanning area of the scanner 100. If, instead, the capstan sensor corrector 234 determines that a different amount of target film 300, 310 was scanned based on the features 302, the capstan sensor corrector 234 may detect an inconsistency in the scan of the target film 300, 310. For example, if 1 mm of target film 300, 310 is expected to be scanned for 5° of rotation for a capstan 106A-D and, based on the features 302, the capstan sensor corrector 234 determines that 1.0001 millimeters of target film 300, 310 is scanned during a 5° rotation at a capstan position 230, 242, 246, the capstan sensor corrector 234 may detect inconsistency for the capstan position 238, 242, 246. In the above example, if the capstan sensor corrector 234 instead determines that 0.9999 millimeters of target film 300 was scanned, the capstan sensor corrector 234 may also detect an inconsistency for the capstan position 238, 242, 246.

The capstan sensor corrector 234 may then calculate an offset factor 240, 244, 248 for the capstan position 230, 242, 246 at which the inconsistency was detected (block 508). The offset factor 240, 244, 248 may be calculated such that, when combined with an expected length of scanned target film 300, the actual length of scanned target film 300, 310 is returned. For example, the offset factor 240, 244, 248 may be calculated by dividing the actual, determined length of scanned target film 300, 310 by the expected length of scanned target film 300, 310. In the above examples, where 1.0001 millimeters of target film 300, 310 was scanned, the offset factor 240, 244, 248 may be calculated as 1.0001 mm/1 mm=1.0001. Similarly, where 0.9999 millimeters of target film 300, 310 was scanned, the offset factor 240, 244, 248 may be calculated as 0.9999 mm/1 mm=0.9999 mm.

The capstan sensor corrector 234 may then add the offset factor 240, 244, 248 to the offset information 236 (block 510). For example, as depicted in FIG. 2B, the capstan sensor corrector 234 may store the offset factor 240, 244, 248 associated with the corresponding capstan position 230, 242, 246 within the offset information 236. In certain implementations, the offset information 236 may be stored and accessed as a lookup table (e.g., a lookup table stored within a field programmable gate array (FPGA)). The offset information 236 may then be used to adjust capstan inputs 210 received from the associated capstan 106A-D (e.g., to calculate an adjusted capstan input 250).

Although discussed in the singular, in certain implementations, the capstan sensor corrector 234 may detect a plurality of inconsistencies in the scan of the target film 300, 310 associated with a plurality of capstan positions 238, 242, 246. The capstan sensor corrector 234 may detect the plurality of inconsistencies in calculating a plurality of associated offset factors using techniques similar to those discussed above in connection with blocks 506, 508.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A system, comprising:
   a processor;
   a radius updater configured to determine, at a plurality of times, a plurality of radii of a first reel having a portion of a film wound thereon, wherein a first radius of the plurality of radii is determined at a first time of the plurality of times and differs from a second radius of the plurality of radii determined at a second time of the plurality of times as the film is advanced between the first reel and a second reel while scanning the film at a constant speed between the first reel and the second reel; and
   a memory including instructions that when executed by the processor configure the system to:
      receive, from a motor used to advance the film between the first reel and the second reel, a plurality of rotational position measurements at the plurality of times while scanning the film;
      generate a control signal for a rate of rotation for the motor; and
      in response to detecting an inconsistency between a measured length of the film having been scanned and an expected length of the film that was expected to have been scanned while scanning the film:
         calculate an offset factor for the motor; and
         adjust the rate of rotation of the motor via the control signal including the offset factor while maintaining the constant speed.

2. The system of claim 1, wherein the offset factor is based on a measurement of the inconsistency.

3. The system of claim 1, wherein the offset factor is based on the plurality of rotational position measurements associated with a time at which the inconsistency was detected.

4. The system of claim 1, wherein the control signal is generated using a single capstan motor profile generator and is provided to at least a first one and a second one of a supply reel motor, a take-up reel motor, and a capstan motor.

5. The system of claim 1, wherein adjusting the rate of rotation for the motor via the control signal including the offset factor maintains a tension in the film between a minimum amount of tension for the film and a maximum amount of tension for the film.

6. The system of claim 5, wherein the minimum amount of tension for the film and the maximum amount of tension for the film are set to ensure that the film consistently moves across a scanning area while avoiding tearing or warping.

7. The system of claim 1, wherein a dynamic resolution adjuster adjusts an encoder position for interpreting a position of the film based on changing radii of the first reel and the second reel as the film is advanced from the first reel to the second reel.

8. The system of claim 7, wherein the motor operates at a constant torque.

9. A method, comprising:
scanning a film;
receiving, from a motor used to advance the film between a first reel and a second reel, a plurality of rotational position measurements at a plurality of times while scanning the film;
determining, via a radius updater, a plurality of radii of at least one of the first reel and the second reel for the plurality of times, wherein a first radius of the plurality of radii is determined at a first time of the plurality of times and differs from a second radius of the plurality of radii determined at a second time of the plurality of times as the film is advanced between the first reel and a second reel while scanning the film at a constant speed between the first reel and the second reel;
generating a control signal for a rate of rotation for the motor based on an associated rotational position of the motor; and
in response to detecting an inconsistency between a measured length of the film having been scanned and an expected length of the film that was expected to have been scanned while scanning the film:
calculating an offset factor for the motor; and
adjusting the rate of rotation of the motor via the control signal including the offset factor while maintaining the constant speed.

10. The method of claim 9, wherein the offset factor is based on a measurement of the inconsistency.

11. The method of claim 9, wherein the offset factor is based on the plurality of rotational position measurements associated with a time at which the inconsistency was detected.

12. The method of claim 9, wherein the control signal is generated using a single capstan motor profile generator and is provided to at least a first one and a second one of a supply reel motor, a take-up reel motor, and a capstan motor.

13. The method of claim 9, wherein adjusting the rate of rotation for the motor via the control signal including the offset factor maintains a tension in the film between a minimum amount of tension for the film and a maximum amount of tension for the film.

14. The method of claim 13, wherein the minimum amount of tension for the film and the maximum amount of tension for the film are set to ensure that the film consistently moves across a scanning area while avoiding tearing or warping.

15. The method of claim 9, wherein a dynamic resolution adjuster adjusts an encoder position for interpreting a position the film based on changing radii of the first reel and the second reel as the film is advanced from the first reel to the second reel.

16. The method of claim 15, wherein the motor operates at a constant torque.

17. A system, comprising:
a first reel, holding a film;
a second reel, configured to receive the film from the first reel;
a line scan camera, disposed between the first reel and the second reel, configured to scan the film;
a motor, configured to provide a plurality of rotational position measurements at a plurality of times while advancing the film from the first reel to the second reel across the line scan camera; and
radius updater configured to:
determine at a plurality of times, a plurality of radii of at least one of the first reel and the second reel, wherein a first radius of the plurality of radii is determined at a first time of the plurality of times and differs from a second radius of the plurality of radii determined at a second time of the plurality of times as the film is advanced between the first reel and a second reel while scanning the film at a constant speed between the first reel and the second reel; and
adjust, in response to detecting an inconsistency between a measured length of the film having been scanned and an expected length of the film that was expected to have been scanned while scanning the film, a rate of rotation of the motor via an offset factor applied to a control signal for the motor while maintaining the constant speed of the film.

18. The system of claim 17, wherein the offset factor is based on a measurement of the inconsistency.

19. The system of claim 17, wherein the offset factor is based on a plurality of rotational position measurements associated with a time at which the inconsistency was detected.

20. The system of claim 17, wherein a dynamic resolution adjuster adjusts an encoder position for interpreting a position of the film based on changing radii of the first reel and the second reel as the film is advanced from the first reel to the second reel.

* * * * *